United States Patent
Hou et al.

(10) Patent No.: US 12,271,406 B2
(45) Date of Patent: Apr. 8, 2025

(54) HYBRID SEARCH FOR PARENT-CHILD RELATED DOCUMENTS

(71) Applicant: Microsoft Technology Licensing, LLC, Redmond, WA (US)

(72) Inventors: Muwu Hou, San Jose, CA (US); Xiuyuan Li, Milpitas, CA (US); Farhan Rohan Toddywala, Jersey City, NJ (US); Yue Ying, San Jose, CA (US); Choong Soon Chang, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/216,957

(22) Filed: Jun. 30, 2023

(65) Prior Publication Data

US 2025/0005047 A1   Jan. 2, 2025

(51) Int. Cl.
   *G06F 16/31*   (2019.01)
   *G06F 16/2455*   (2019.01)
   *G06F 16/332*   (2019.01)
   *G06F 16/335*   (2019.01)

(52) U.S. Cl.
   CPC ........ *G06F 16/328* (2019.01); *G06F 16/2456* (2019.01); *G06F 16/3325* (2019.01); *G06F 16/335* (2019.01)

(58) Field of Classification Search
   CPC ............... G06F 16/328; G06F 16/2456; G06F 16/3325; G06F 16/335
   USPC ......................................................... 707/741
   See application file for complete search history.

(56) References Cited

U.S. PATENT DOCUMENTS

| | | | |
|---|---|---|---|
| 8,086,598 B1* | 12/2011 | Lamb | G06F 16/24544 707/606 |
| 10,579,609 B2* | 3/2020 | Goel | G06F 16/2329 |
| 12,088,718 B2* | 9/2024 | Baessler | H04L 9/3213 |
| 2008/0033914 A1* | 2/2008 | Cherniack | G06F 16/283 |
| 2012/0059823 A1* | 3/2012 | Barber | G06F 16/328 707/E17.089 |
| 2016/0055188 A1* | 2/2016 | Goel | G06F 21/6218 707/741 |
| 2017/0011084 A1* | 1/2017 | Goel | G06F 16/319 |
| 2024/0184789 A1* | 6/2024 | Pearman | G06F 16/24578 |

* cited by examiner

*Primary Examiner* — Giovanna B Colan
(74) *Attorney, Agent, or Firm* — KDW FIRM PLLC (57) ABSTRACT

Techniques for implementing a hybrid search for documents having a parent-child relationship are disclosed. In some embodiments, a computer-implemented method comprises: building a base index using a first table of parent documents and a second table of child documents, the base index storing document identifiers of the parent and child documents in contiguous document blocks, where each document block stores the document identifier of a parent documents and the document identifier of each one of the child documents that is related to the parent document in a sorted order; subsequent to the building of the base index, updating a live index to include document identifiers of additional parent documents that have been added the first table and document identifiers of additional child documents that have been added to the second table; and computing a hybrid set of search results for a search query using the base index and the live index.

18 Claims, 6 Drawing Sheets

HYBRID SEARCH FOR PARENT-CHILD RELATED DOCUMENTS

TECHNICAL FIELD

The present application relates generally to implementing a hybrid search for documents having a parent-child relationship.

BACKGROUND

Some search queries may involve searching two or more tables storing documents that are related to one another. Online services may use a search index to facilitate fast and accurate processing of search queries. A search index is a body of structured data that a search engine refers to when looking for results that are relevant to a specific query. Current approaches for building, updating, and searching a search index to accommodate the querying of data from multiple tables that have documents that are related on one another have trade-offs in terms of indexing complexity and search execution efficiency. Some search index configurations result in efficient creation and updating of the search index, but inefficient search execution, while other search index configurations result in efficient search execution, but inefficient creation and updating of the search index.

Additional technical problems arise in approaches that use denormalization, in which data of a parent document is stored as part of the index entry for each child document that is related to the parent document. Although such denormalization techniques are used to improve the read performance of the search index, they are not scalable. Storing a copy of the data of the parent document redundantly for each related child document results dramatically increases the complexity of performing real-time updates of the search index and involves an excessive consumption of memory. This scalability problem is especially apparent in situations in which the parent documents correspond to user profiles on an online service. For online services that manage millions of user profiles, redundantly storing a copy of data of each user profile with the index entry of each document that is related to the user profile places a significant burden on the resources of the underlying computer system that are involved with processing real-time updates and storing all of the redundant data.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

I. Overview

In the following description, for purposes of explanation, numerous specific details are set forth in order to provide a thorough understanding of example embodiments. It will be evident, however, to one skilled in the art that the present embodiments may be practiced without these specific details.

The above-discussed technical problem of the trade-offs in terms of indexing complexity and search execution efficiency is addressed by one or more example embodiments disclosed herein, in which a specially-configured computer system is configured to use a hybrid search of a base index that indexes older generation documents using a document block index structure and a live index that indexes younger generation documents (documents that have not yet been indexed to the base index) without the use of the document block index structure. The computer system generates, in response to a search query, a hybrid set of search results based on searches of both the base index and the live index. A middle index may also be used for snapshotting the younger generation documents from the live index, and the computer system may search the middle index as well in its generation of the hybrid set of search results.

In some example embodiments, the computer system stores parent documents of a first type and a corresponding document identifier for each one of the parent documents in a first table, and stores child documents of a second type and a corresponding document identifier for each one of the child documents in a second table, where the second table comprises, for each one of the child documents, an indication that the child document is related to one of the parent documents. The terms "parent" and "child" are used in this disclosure in association with documents in order to reflect the one-to-many relationship between the first table and the second table. In one example in which the first table stores parent documents that comprise profiles of users of an online service and the second table stores child documents that comprise resumes of the users of the online service, each user may have only a single profile, but many resumes, thereby creating a one-to-many relationship between the parent document that comprises the profile of the user and the one or more child documents that comprise the resumes of the same user.

In some example embodiments, the computer system builds a base index using the first table and the second table, where the base index stores the document identifiers of the parent documents and the document identifiers of the child documents in contiguous document blocks. Each one of the document blocks stores the document identifier of one of the parent documents and the document identifier of each one of the child documents that is related to the parent document in a sorted order. In some example embodiments, the storing of the document identifier of one of the parent documents and the document identifier of each one of the child documents that is related to the parent document in the sorted order by each one of the document blocks comprises storing the document identifier of one of the parent documents directly preceded by the document identifier of each one of the child documents that is related to the parent document based on the indications in the second table. Each one of the document blocks stores the document identifier of one of the parent documents directly preceded by the document identifier of each one of the child documents that is related to the parent document based on the indications in the second table. The base index further stores document data of each one of the parent documents in association with the document identifier of the parent document and document data of each one of the child documents in association with the document identifier of the child document.

In some example embodiments, subsequent to the building of the base index, the computer system updates a live index to include document identifiers of additional parent documents that have been added the first table and document identifiers of additional child documents that have been added to the second table. The live index stores document data of each one of the additional parent documents in association with the document identifier of the additional parent document and document data of each one of the additional child documents in association with the document identifier of the additional child document.

In some example embodiments, the computer system then receives a search query from a computing device of a user, computes a first set of search results based on a search of the base index using the search query and a second set of search results based on a search of the live index using the search query, and then computes a hybrid set of search results comprising a combination of the first set of search results and the second set of search results. The searches may be performed using JOIN clauses to query data from the first table and the second table tables based on the relationships between those tables. The computer system may then cause the hybrid set of search results to be displayed on the computing device of the user.

The base index is efficient to read from when performing searches based on its use of contiguous document blocks. However, that same contiguous document block configuration makes the base index inefficient to write to when updating the base index to reflect recent changes to the first and second tables, since the particular order of the document blocks in the base index is immutable and needs to be maintained. Since the live index does not need to maintain this particular order that is dictated by the document block architecture of the base index, the live index is much more efficient to write to when capturing updates to the first and second tables. However, the live index is not as efficient to read from when performing searches, since it lacks this invariant document block architecture.

By using a hybrid of the document block indexing structure of the base index for older generation documents and the less constrained indexing structure of the live index for younger generation documents, as well as a hybrid of searching techniques on the different indexes, as disclosed herein, the computer system leverages the speed and efficiency of the document block indexing structure of the base index in searching for older generation documents, while using the live index to support real-time updates of the table in order to avoid the complexity and inefficiency of relying on the base index for such real-time updates. As a result, the computer system is able to reduce indexing complexity and increase search execution efficiency by using the techniques disclosed herein. Additionally, the computer system increases search execution efficiency without using denormalization techniques that involve storing redundant data in a way that excessively consumes the resources (e.g., memory) of the computer system, thereby improving scalability.

In addition to embodiments involving the storing, indexing, and querying of documents, the features of the present disclosure may also be applied to the storing, indexing, and querying of other types of data items and content as well. For example, the use of documents in the features and operations discussed in the present disclosure may be substituted with the use of images, video, audio, and multimedia content.

II. Detailed Example Embodiments

The methods or embodiments disclosed herein may be implemented as a computer system having one or more components implemented in hardware or software. For example, the methods or embodiments disclosed herein may be embodied as instructions stored on a machine-readable medium that, when executed by one or more hardware processors, cause the one or more hardware processors to perform the instructions.

Figure 1:
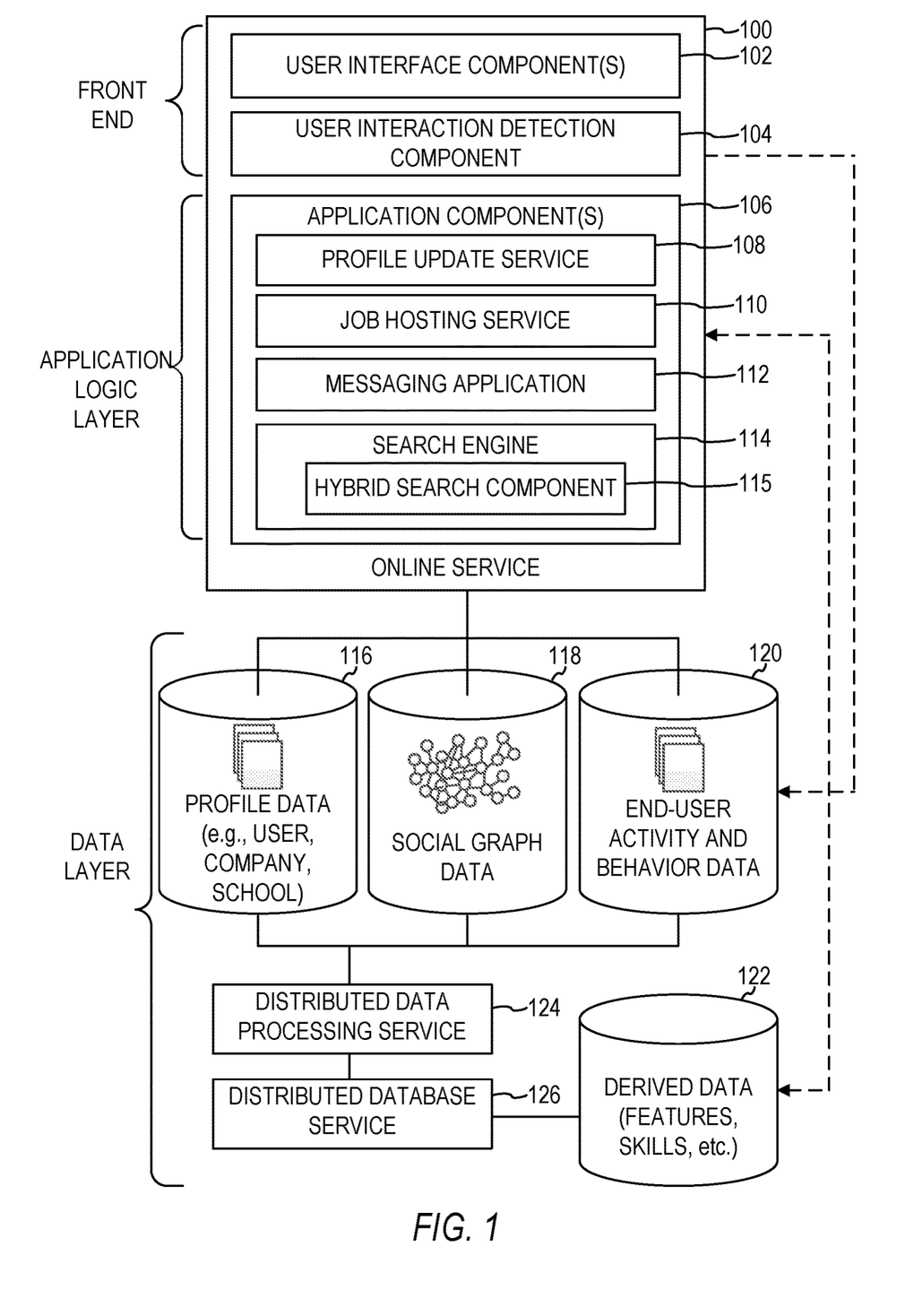
FIG. 1 is a block diagram illustrating a hybrid search component implemented within an online service, in accordance with an example embodiment.

FIG. 1 is a block diagram illustrating a hybrid search component 115 implemented within an online service 100, in accordance with an example embodiment. As shown in FIG. 1, a front end may comprise one or more user interface components (e.g., a web server) 102, which receives requests from various client computing devices and communicates appropriate responses to the requesting client devices. For example, the user interface component(s) 102 may receive requests in the form of Hypertext Transfer Protocol (HTTP) requests or other web-based API requests. In addition, a user interaction detection component 104, sometimes referred to as a click tracking service, may be provided to detect various interactions that end-users have with different applications and services, such as those included in the application logic layer of the online service 100. As shown in FIG. 1, upon detecting a particular interaction, the user interaction detection component 104 logs the interaction, including the type of interaction and any metadata relating to the interaction, in an end-user activity and behavior database 120. Accordingly, data from this database 120 can be further processed to generate data appropriate for training one or more machine-learned models, and in particular, for training models to rank a set of skills for an end-user.

An application logic layer may include one or more application components 106, which, in conjunction with the user interface component(s) 102, generate various user interfaces (e.g., web pages) with data retrieved from various data sources in a data layer. Consistent with some embodiments, individual application components 106 implement the functionality associated with various applications and/or services provided by the online service 100. For instance, as illustrated in FIG. 1, the application logic layer includes a variety of applications and services to include a profile update service 108, a hosting service 110, a messaging application 112, and a search engine 114. The various applications and services illustrated as part of the application logic layer are provided as examples and are not meant to be an exhaustive listing of all applications and services that may be integrated with and provided as part of the online service 100. As end-user's interact with the various user interfaces and content items presented by these applications and services, the user interaction detection component 104 detects and tracks the end-user interactions, logging relevant information for subsequent use.

As shown in FIG. 1, the data layer may include several databases, such as a profile database 116 for storing profile data, including both end-user profile data and profile data for various organizations (e.g., companies, schools, etc.). Consistent with some embodiments, when a person initially registers to become an end-user of the online service 100, the person will be prompted by the profile update service 108 to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 116. Similarly, when a representative of an organization initially registers the organization with the online service 100, the representative may be prompted to provide certain information about the organization. This information may be stored, for example, in the profile database 116, or another database (not shown).

Once registered, an end-user may invite other end-users, or be invited by other end-users, to connect via the online service 100. A "connection" may constitute a bilateral agreement by the end-users, such that both end-users acknowledge the establishment of the connection. Similarly, with some embodiments, an end-user may elect to "follow" another end-user. In contrast to establishing a connection, the concept of "following" another end-user typically is a unilateral operation and, at least with some embodiments, does not require acknowledgement or approval by the end-user that is being followed. When one end-user follows another, the end-user may receive status updates relating to the other end-user, or other content items published or shared by the other end-user user who is being followed. Similarly, when an end-user follows an organization, the end-user becomes eligible to receive status updates relating to the organization as well as content items published by, or on behalf of, the organization. For instance, content items published on behalf of an organization that an end-user is following will appear in the end-user's personalized feed, sometimes referred to as a content feed or news feed. In any case, the various associations and relationships that the end-users establish with other end-users, or with other entities (e.g., companies, schools, organization) and objects (e.g., metadata hashtags ("#topic") used to tag content items), are stored and maintained within a social graph in a social graph database 118.

In some example embodiments, the job hosting service 110 is configured to enables end-users to submit job postings that can be searched by end-users. For example, the job hosting service 110 may provide a user interface configured to enable users to publish online job postings on the online service 100, and another user interface configured to enable users to view and apply for the online job postings published on the online service 100. The job hosting service 110 may enable users to upload and submit their resumes when applying for a job posting. Resumes may be submitted as a file, such as a Portable Document Format (PDF) file or a word processing document file. Resumes are often created or updated to target specific jobs or specific types of jobs, such as by highlighting specific skills relevant to a targeted job posting, whereas profiles are often less specific to a particular job posting. As a result, the resumes of a user may include data that does not appear in the profile of the user, and vice-versa. The resumes submitted by the users may be stored in a database of the online service 100.

In some example embodiments, the messaging application 112 is configured to enable a user of the online service 100 to send messages to other users of the online service 100. The messaging application 112 may manage a group of messages between users as a single thread forming a conversation between the users. Based on the one-to-many relationship between a conversation and the messages of the conversation, the messages of the conversation may be stored as child documents within indications that they are related to a parent document for the conversation.

As end-users interact with the various content items that are presented via the applications and services of the online service 100, the end-users' interactions and behaviors (e.g., content viewed, links or buttons selected, messages responded to, job postings viewed, etc.) are tracked by the user interaction detection component 104, and information concerning the end-users' activities and behaviors may be logged or stored, for example, as indicated in FIG. 1 by the end-user activity and behavior database 120.

Consistent with some embodiments, data stored in the various databases of the data layer may be accessed by one or more software agents or applications executing as part of a distributed data processing service 124, which may process the data to generate derived data. The distributed data processing service 124 may be implemented using Apache Hadoop® or some other software framework for the processing of extremely large data sets. Accordingly, an end-user's profile data and any other data from the data layer may be processed (e.g., in the background or offline) by the distributed data processing service 124 to generate various derived profile data. As an example, if an end-user has provided information about various job titles that the end-user has held with the same organization or different organizations, and for how long, this profile information can be used to infer or derive an end-user profile attribute indicating the end-user's overall seniority level or seniority level within a particular organization. This derived data may be stored as part of the end-user's profile or may be written to another database.

In addition to generating derived attributes for end-users' profiles, one or more software agents or applications executing as part of the distributed data processing service 124 may ingest and process data from the data layer for the purpose of generating training data for use in training various machine-learned models, and for use in generating features for use as input to the trained models. For instance, profile data, social graph data, and end-user activity and behavior data, as stored in the databases of the data layer, may be ingested by the distributed data processing service 124 and processed to generate data properly formatted for use as training data for training machine-learned models for constructing a taxonomy graph of entities. Once the derived data and features are generated, they are stored in a database 122, where such data can easily be accessed via calls to a distributed database service 124.

The search engine 114 may be configured to perform a search of documents of the online service 100 based on a search query submitted to the search engine 114. For example, a recruiter attempting to find candidates for a job that have a particular skill may submit a search query that includes an identification of that skill to the search engine 114, such as via a user interface of the search engine 114, and the search engine 114 may then search profiles and resumes of users of the online service 100 to find search results including users who have the particular skill identified by the search query. The search engine 114 may return the profiles of users whose resumes or profiles satisfy one or more matching criteria with respect to the search query. The search engine 114 may be configured to perform other types of searches for other types of search queries for other types of documents.

Figure 2:
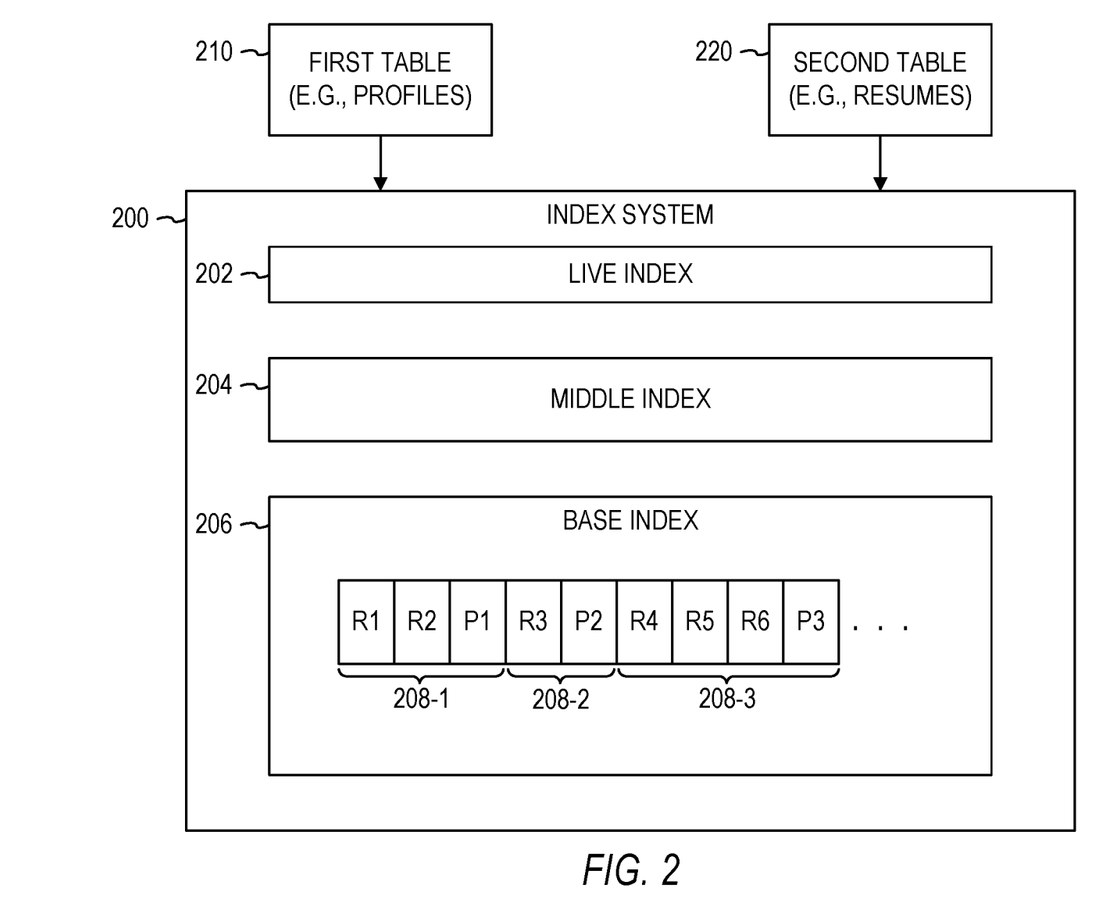
FIG. 2 is a block diagram illustrating functional components of an index system managed by a hybrid search component, in accordance with an example embodiment.

In some example embodiments, the search engine 114 comprises a hybrid search component 115 that is configured to use an index system to implement a hybrid search for documents that are related and stored in different tables. FIG. 2 is a block diagram illustrating functional components of an index system 200 managed by the hybrid search component 115, in accordance with an example embodiment. The index system 200 is configured to store information about documents in a first table 210 and documents in a second table 220 in an easily searchable format so that the search engine 114 can efficiently and effectively compute search results for search queries.

The first table 210 stores parent documents of a first type along with a corresponding document identifier for each one of the parent documents. The parent documents may be created based on input provided by users of the online service 100, such as with profiles of users that are created based on profile data that is input by the users (e.g., via the profile update service 108), and then may be stored in response to their creation. Alternatively, the parent documents may be uploaded in their stored form (e.g., a PDF file or a word processing file) by the users.

In some example embodiments, the second table stores child documents of a second type different from the first type along with a corresponding document identifier for each one of the child documents. The second table 220 comprises, for each one of the child documents, an indication that the child document is related to one of the parent documents. For example, the second table 220 may comprise a field for each child document indicating to which parent document that child document relates. In an example embodiment in which the parent documents comprise profiles of users of the online service 100 and the child documents comprise resumes of the users of the online service 100, the second table 220 may comprise a column of foreign keys that are used to link each resume of a user in the second table 220 to a profile of the user in the first table 210. Other types of parent documents and child documents are also within the scope of the present disclosure. For example, the parent documents may comprise conversations between users of the online service 100 and the child documents may comprise messages between users of the online service 100. In some example embodiments, each parent document is stored in the same partition as its related child documents.

The index system 200 may comprise a live index 202, a middle index 204, and a base index 206. The live index 202 may comprise a hash map, while the middle index 204 and the base index 206 may each comprise a compressed inverted index. A hash map, also known as a hash table, is a data structure that implements an associative array, mapping keys to values. A hash map uses a hash function to compute an index into an array from which the desired value can be found. During lookup, the key is hashed and the resulting hash indicates where the corresponding value is stored. An inverted index is a database index that stores a mapping from content, such as words or other values, to its locations in a table, or in a document or a set of documents. An inverted index maps content or values to documents. Other types of data structures may be used for the live index 202, the middle index 204, and the base index 206, as well.

The live index 202 may be configured to store all recent updates to the first and second tables 210 and 220. For example, in response to a change (e.g., adding a document, removing a document, modifying a document) being made to the first table 210 or to the second table 220, a record of the change may immediately be stored in the live index 202. Periodically, after a first predetermined amount of time (e.g., every 3 hours), the index system 200 may perform snapshotting of the live index 202, in which the contents of the live index 202 are saved to the middle index 204. After the contents of the live index 202 are saved to the middle index 204, the live index 202 may be cleared. Periodically, after a second predetermined amount of time that is larger than the first predetermined amount of time (e.g., once a week), the base index 206 may be built using the data from the middle index 204. Accordingly, the live index 202 can be merged with the middle index 204, and the middle index 204 can subsequently be merged with the based index 206. In some example embodiments, the index system 200 does not use the middle index 204, but rather saves the content of the live index 202 directly to the base index 206.

The live index 202, the middle index 204, and the base index 206 may each store information about the parent documents and the child documents stored in the first table 210 and the second table 220. The information for each document may be stored as a single entry in the respective index and may include, but is not limited to, a document identifier that identifies the document, as well as document data that includes information contained within the document (e.g., skills included in a resume, skills included in a profile). The information may also include an indication of one or more other documents to which the document relates. For example, an entry for a child document may comprise a link or a pointer to a parent document to which the child document is related, as indicated in the second table 220 (e.g., via a foreign key field). In some example embodiments, the hybrid search component 115 is configured to use a combination of a block join technique for the base index 206 and a query-time join technique for the live index 202 and the middle index 204 in performing a search for a search query that has been received by the search engine 114.

The block join technique involves storing information about the parent documents and the child documents contiguously in a particular sorted order in the base index 206, where document identifiers of child documents directly precede the document identifiers of their related parent documents. Each parent document and its related child documents are stored as part of a corresponding document block 208. In the example shown in FIG. 2, entries for child documents R1 and R2 directly precede an entry for their related parent document P1 in document block 208-1, an entry of child document R3 directly precedes an entry for its related parent document P2 in document block 208-2, and entries for child documents R4, R5, and R6 directly precede an entry for their related parent document P3. This special sorted ordering of the documents within the base index 206 enables the hybrid search component 115 to join structured data from child documents to parent documents without breaking the invariant that the document identifiers remain sorted as the document retrieval of the search is performed.

However, using the block join technique to capture updates to the first table 210 or the second table 220 in real-time suffers from scalability issues that would significantly burden the underlying computer system of the online service 100, since the block join technique relies on the immutable order of the document blocks and the index entries for their corresponding parent and child documents. Updating the live index 202 and the middle index 204 in a scenario where they used the block join technique would involve frequent rebuilding of the live index 202 and the middle index 204 to capture recent changes to the first table 210 and the second table 220 in real-time. Additionally, using the base index 206 to capture table updates in real-time would also involve frequent rebuilds. In scenarios where the online service 100 manages tens or hundreds of millions of parent documents that each have document data and often have at least one related child document, such as with an online social network service that manages tens or hundreds of millions of user profiles as the parent documents and related resumes as the child documents, performing frequent index rebuilds for such a large number of parent and child documents places an impractical processing load on the resources of the online service 100. Therefore, in order to avoid this burden on the resources of the online service 100, the online service 100 may employ the query-time join technique for the live index 202 and the middle index 204 in order to make real-time data available for efficient search without having to perform a complex index rebuild.

The query-time join technique involves performing a search in two phases. The first phase performs a search over entries in the live index 202 and in the middle index 204 that correspond to a first set of documents, such as the child documents, where another field value is extracted from each retrieved document. Then, these field values are used in the second phase search to join to a second set of documents, such as the parent documents. This type of query provides functionality for a general and flexible join in an inverted index. In some example embodiments, the hybrid search component 115 executes a subquery exhaustively, collecting all matches for a search query up to a specified limit. Then, the actual retrieval query may be executed as a disjunction over the retrieved documents, which may comprise a user identification query with all user identifications for the first set of documents (e.g., resumes) that met the retrieval subquery criteria.

The base index 206 is used to represent all of the parent documents and child documents in the first table 210 and the second table 220, whereas the live index 202 is only used to represent recent updates to the first table 210 and the second table 220. Therefore, the amount of data stored in the base index 206 is significantly larger than the amount of data stored in the live index 202, particularly in scenarios where the live index 202 and the base index 206 are used to index documents for tens or hundreds of millions of users. It is inefficient to use the same approach for two different indices storing such vastly different amounts of data. By using a hybrid of the block join technique and the query-time technique, the hybrid search component 115 provides a solution that efficiently takes advantage of the dramatic difference in size between the live index 202 and the base index 206.

In some example embodiments, the hybrid search component 115 is configured to receive a search query from a computing device of a user. For example, a recruiter may enter one or more skills in a search field of a user interface of the search engine 114 for use in a search query for users of the online service 100 that have those skills explicitly listed in or implicitly inferred by the profiles or resumes of those users. Other types of search queries are also within the scope of the present disclosure.

The hybrid search component 115 may be configured to compute a first set of search results based on a search of the base index 206 using the search query. The hybrid search component 115 may be configured to rewrite the search query into a JOIN query that includes a JOIN clause. The first set of search results comprises the document identifiers of a subset of the parent documents based on a determination that document data of the child documents related to the subset of the parent documents matches the search query. In one example where the parent documents comprise profiles, the child documents comprise resumes, and the search query comprises a skill, the hybrid search component 115 may search through the base index 206 to determine if the document data of any of the child documents matches the skill of the search query. If the document data of one of the child documents is determined to match the skill, then the hybrid search component 115 may use the document block structure of the base index 206 to identify the related parent document of the child document in which the match was found and include the identified parent document, or an identification of the parent document, in the first set of search results.

In some example embodiments, the hybrid search component 115 is configured to compute a second set of search results based on a search of the live index 202, and optionally the middle index 204 as well, using the search query. The second set of search results comprises the document identifiers of a subset of the parent documents based on a determination that document data of the child documents related to the subset of the parent documents matches the search query. The search of the live index 202 may comprise a first phase and a second phase. During the first phase, the online service 100 may perform a search over the document data of the child documents in the live index 202 using the search query, and the hybrid search component 115 may extract a field value from each retrieved child document, where the field value indicates a parent document that is related to the child document. During the second phase, these field values may be used to join to corresponding parent documents. In some example embodiments, the search of the live index 202 is performed using a JOIN clause.

The hybrid search component 115 may be configured to compute a hybrid set of search results comprising a combination of the first set of search results and the second set of search results. The hybrid search component 115 may then causes the hybrid set of search results to be displayed on the computing device of the user. For example, in response to receiving a search query for users who have a particular skill, the hybrid search component 115 may compute a hybrid set of search results that includes identifications of user profiles that were matched to the search query via a search of the base index 206 and a search of the live index 202 (and optionally a search of the middle index 204, as well), and then display the hybrid set of search results on a computing device.

Figure 3:
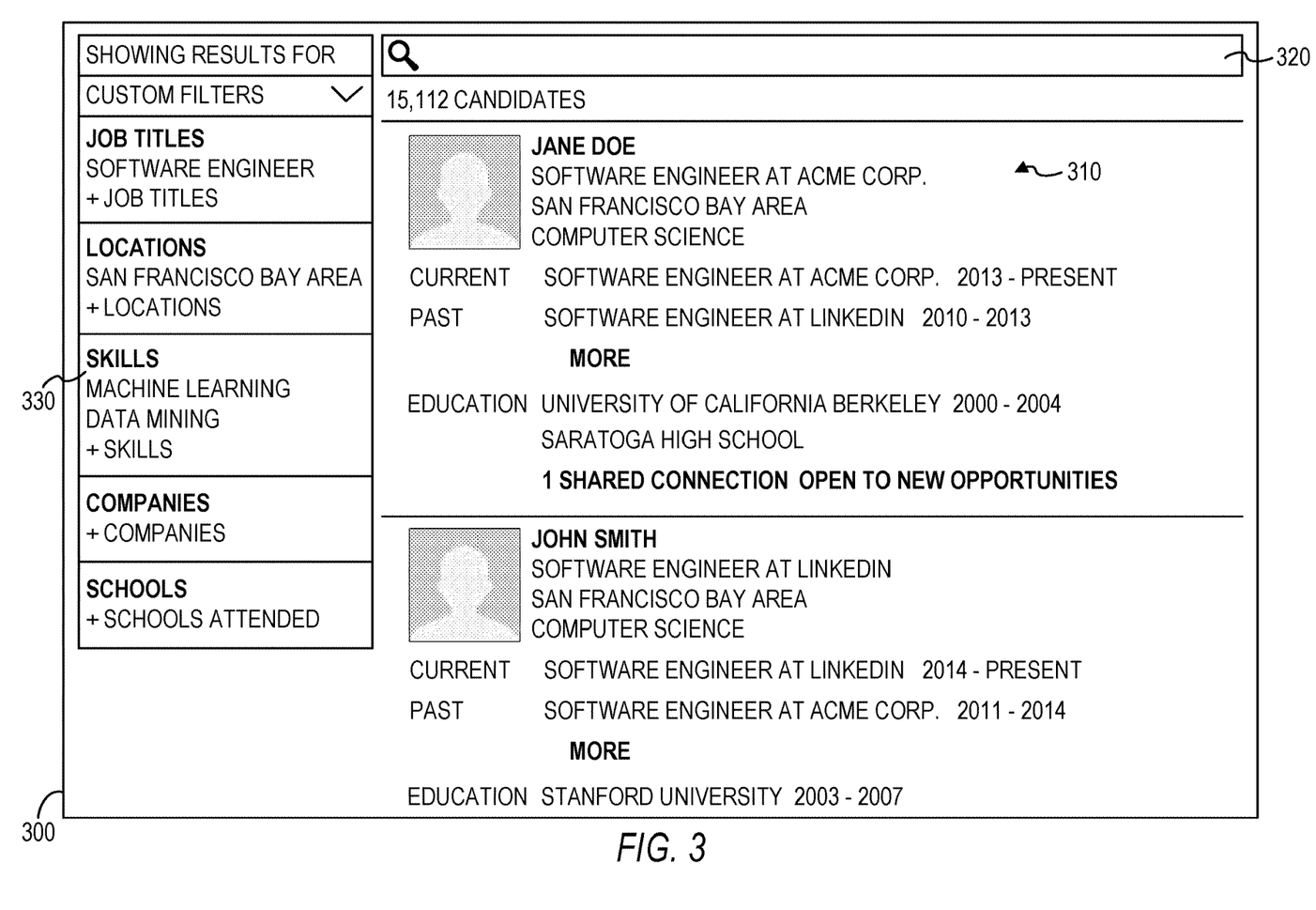
FIG. 3 illustrates a graphical user interface (GUI) in which a search query may be submitted by a user and search results may be displayed to the user, in accordance with an example embodiment.

FIG. 3 illustrates a graphical user interface (GUI) 300 in which a search query may be submitted by a user and search results may be displayed to the user, in accordance with an example embodiment. In some example embodiments, the search engine 114 is configured to select profiles of users that are potential job candidates based at least in part on a search query submitted by a user who is searching (referred to as a "searching user") for potential job candidates, and to cause the selected profiles of the users to be displayed on a search results page of the GUI 300 to the searching user. In the GUI 300, the searching user (e.g., a recruiter) may submit one or more terms of a search query using one or more user interface elements. For example, the searching user may submit the term(s) by either entering text into a search field 320 or by using a custom search filters panel 330 via which the searching user may select and enter the terms based on the corresponding category of the terms (e.g., job titles, locations, skills, companies, schools). In response to the search query submitted by the searching user, the search engine 114 may cause search results 310 that identify the selected profiles to be displayed on the search results page. The search engine 114 may use the features of the hybrid search component 115 in selecting which user profiles to present as search results.

Figure 4:
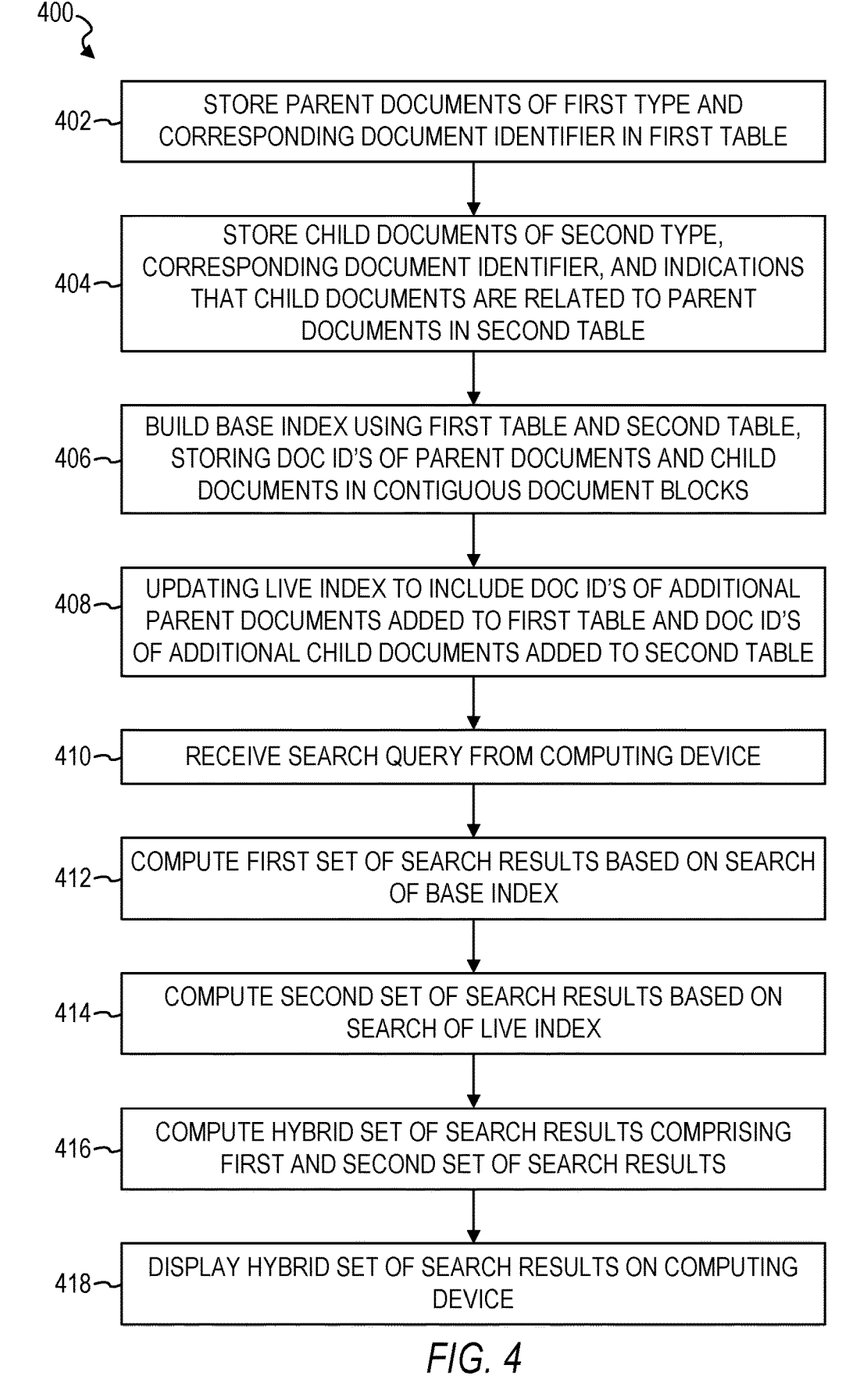
FIG. 4 is a flowchart illustrating a method of implementing a hybrid search for documents having a parent-child relationship, in accordance with an example embodiment.

FIG. 4 is a flowchart illustrating a method 400 of implementing a hybrid search for documents having a parent-child relationship, in accordance with an example embodiment. The method 400 can be performed by processing logic that can comprise hardware (e.g., circuitry, dedicated logic, programmable logic, microcode, etc.), software (e.g., instructions run on a processing device), or a combination thereof. In one implementation, the method 400 is performed by the online service 100 of FIG. 1, or any combination of one or more of its components (e.g., the hybrid search component 115), as described above.

At operation 402, the online service 100 stores parent documents of a first type and a corresponding document identifier for each one of the parent documents in a first table 210. The parent documents may be created based on input provided by users of the online service 100, such as with profiles of users that are created based on profile data that is input by the users, and then may be stored in response to their creation. Alternatively, the parent documents may be uploaded in their stored form (e.g., a PDF file or a word processing file) by the users.

At operation 404, the online service 100 stores child documents of a second type and a corresponding document identifier for each one of the child documents in a second table 220. The second table 220 comprises, for each one of the child documents, an indication that the child document is related to one of the parent documents. For example, the second table 220 may comprise a field for each child document indicating to which parent document that child document relates. In an example embodiment in which the parent documents comprise profiles of users of the online service 100 and the child documents comprise resumes of the users of the online service 100, the second table 220 may comprise a column of foreign keys that are used to link each resume of a user in the second table 220 to a profile of the user in the first table 210. Other types of parent documents and child documents are also within the scope of the present disclosure. For example, the parent documents may comprise conversations between users of the online service 100 and the child documents may comprise messages between users of the online service 100. In some example embodiments, each parent document is stored in the same partition as its related child documents.

At operation 406, the online service 100 builds a base index 206 using the first table 210 and the second table 220. The base index 206 stores the document identifiers of the parent documents and the document identifiers of the child documents in contiguous document blocks 208. Each one of the document blocks 208 stores the document identifier of one of the parent documents and the document identifier of each one of the child documents that is related to the parent document based on the indications in the second table 220 in a sorted order. In some example embodiments, each one of the document blocks 208 stores the document identifier of one of the parent documents directly preceded by the document identifier of each one of the child documents that is related to the parent document. The base index 206 may further store document data of each one of the parent documents in association with the document identifier of the parent document and document data of each one of the child documents in association with the document identifier of the child document. For example, in addition to storing an identifier of a resume or an identifier of a profile, the base index 206 may also store data contained within the resume or profile, such as skills that are listed in the resume or profile. The base index 206 may comprise a compressed inverted index. However, other types of data structures may be used for the base index 206.

At operation 408, the online service 100, subsequent to the building of the base index 206, updates a live index 202 to include document identifiers of additional parent documents that have been added the first table 210 and document identifiers of additional child documents that have been added to the second table 220. In some example embodiments, the live index 202 stores document data of each one of the additional parent documents in association with the document identifier of the additional parent document and document data of each one of the additional child document in association with the document identifier of the additional child document. The live index 202 may comprise a hash map. However, other types of data structures may be used for the live index 202.

At operation 410, the online service 100 receives a search query from a computing device of a user. For example, a recruiter may enter one or more skills in a search field of a user interface of the search engine 114, such as in the search field 320 in FIG. 3, for use in a search query for users of the online service 100 that have those skills explicitly listed in or implicitly inferred by the profiles or resumes of those users. The search query may additionally or alternatively include one or more search filters. These search filters explicitly selected by the user, such as via the custom search filters panel 330 shown in FIG. 3. Other types of search queries are also within the scope of the present disclosure.

At operation 412, the online service 100 computes a first set of search results based on a search of the base index 206 using the search query. The first set of search results comprises the document identifiers of a subset of the parent documents based on a determination that document data of the child documents related to the subset of the parent documents matches the search query. The search of the base index 206 may be performed using a JOIN clause. In one example where the parent documents comprise profiles, the child documents comprise resumes, and the search query comprises a skill, the online service 100 may search through the base index 206 to determine if the document data of any of the child documents matches the skill of the search query. If the document data of one of the child documents is determined to match the skill, then the online service 100 may use the document block structure of the base index 206 to identify the related parent document of the child document in which the match was found and include the identified parent document, or an identification of the parent document, in the first set of search results. In embodiments in which a search filter is included in the search query, search results may be filtered out from inclusion in the first set of search results based on the application of the search filter.

At operation 414, the online service 100 computes a second set of search results based on a search of the live index 202 using the search query. The second set of search results comprises the document identifiers of a subset of the additional parent documents based on a determination that document data of the additional child documents related to the subset of the additional parent documents matches the search query. The search of the live index 202 may comprise a first phase and a second phase. During the first phase, the online service 100 may perform a search over the document data of the child documents in the live index 202 using the search query, and the online service 100 may extract a field value from each retrieved child document, where the field value indicates a parent document that is related to the child document. During the second phase, these field values may be used to join to corresponding parent documents. In some example embodiments, the computing of the second set of search results based on the search of the live index comprises performing an exhaustive search of the document data associated with the document identifiers of the child documents in the live index 202 using the search query to identify a subset of the child documents, and then performing a search for the document identifiers of the parent documents related to the child documents in the identified subset of child documents. In embodiments in which a search filter is included in the search query, search results may be filtered out from inclusion in the second set of search results based on the application of the search filter. In some example embodiments, the search of the live index 202 is performed using a JOIN clause.

At operation 416, the online service 100 computes a hybrid set of search results comprising a combination of the first set of search results and the second set of search results. The online service 100 then causes the hybrid set of search results to be displayed on the computing device of the user, at operation 418. For example, in response to receiving a search query for users who have a particular skill, the online service 100 may compute a hybrid set of search results that includes identifications of user profiles that were matched to the search query via a search of the base index 206 and a search of the live index 202, and then display the hybrid set of search results on a computing device, such as shown with the search results 310 in FIG. 3.

It is contemplated that any of the other features described within the present disclosure can be incorporated into the method 400.

Certain embodiments are described herein as including logic or a number of components or mechanisms. Components may constitute either software components (e.g., code embodied (1) on a non-transitory machine-readable medium or (2) in a transmission signal) or hardware-implemented components. A hardware-implemented component is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented component that operates to perform certain operations as described herein.

In various embodiments, a hardware-implemented component may be implemented mechanically or electronically. For example, a hardware-implemented component may comprise dedicated circuitry or logic that is permanently configured (e.g., as a special-purpose processor, such as a field programmable gate array (FPGA) or an application-specific integrated circuit (ASIC)) to perform certain operations. A hardware-implemented component may also comprise programmable logic or circuitry (e.g., as encompassed within a programmable processor) that is temporarily configured by software to perform certain operations. It will be appreciated that the decision to implement a hardware-implemented component mechanically, in dedicated and permanently configured circuitry, or in temporarily configured circuitry (e.g., configured by software) may be driven by cost and time considerations.

Accordingly, the term "hardware-implemented component" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented components are temporarily configured (e.g., programmed), each of the hardware-implemented components need not be configured or instantiated at any one instance in time. For example, where the hardware-implemented components comprise a processor configured using software, the processor may be configured as respective different hardware-implemented components at different times. Software may accordingly configure a processor, for example, to constitute a particular hardware-implemented component at one instance of time and to constitute a different hardware-implemented component at a different instance of time.

Hardware-implemented components can provide information to, and receive information from, other hardware-implemented components. Accordingly, the described hardware-implemented components may be regarded as being communicatively coupled. Where multiple of such hardware-implemented components exist contemporaneously, communications may be achieved through signal transmission (e.g., over appropriate circuits and buses) that connect the hardware-implemented components. In embodiments in which multiple hardware-implemented components are configured or instantiated at different times, communications between such hardware-implemented components may be achieved, for example, through the storage and retrieval of information in memory structures to which the multiple hardware-implemented components have access. For example, one hardware-implemented component may perform an operation, and store the output of that operation in a memory device to which it is communicatively coupled. A further hardware-implemented component may then, at a later time, access the memory device to retrieve and process the stored output. Hardware-implemented components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions. The components referred to herein may, in some example embodiments, comprise processor-implemented components.

Similarly, the methods described herein may be at least partially processor-implemented. For example, at least some of the operations of a method may be performed by one or more processors or processor-implemented components. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a component, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on target data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 5:
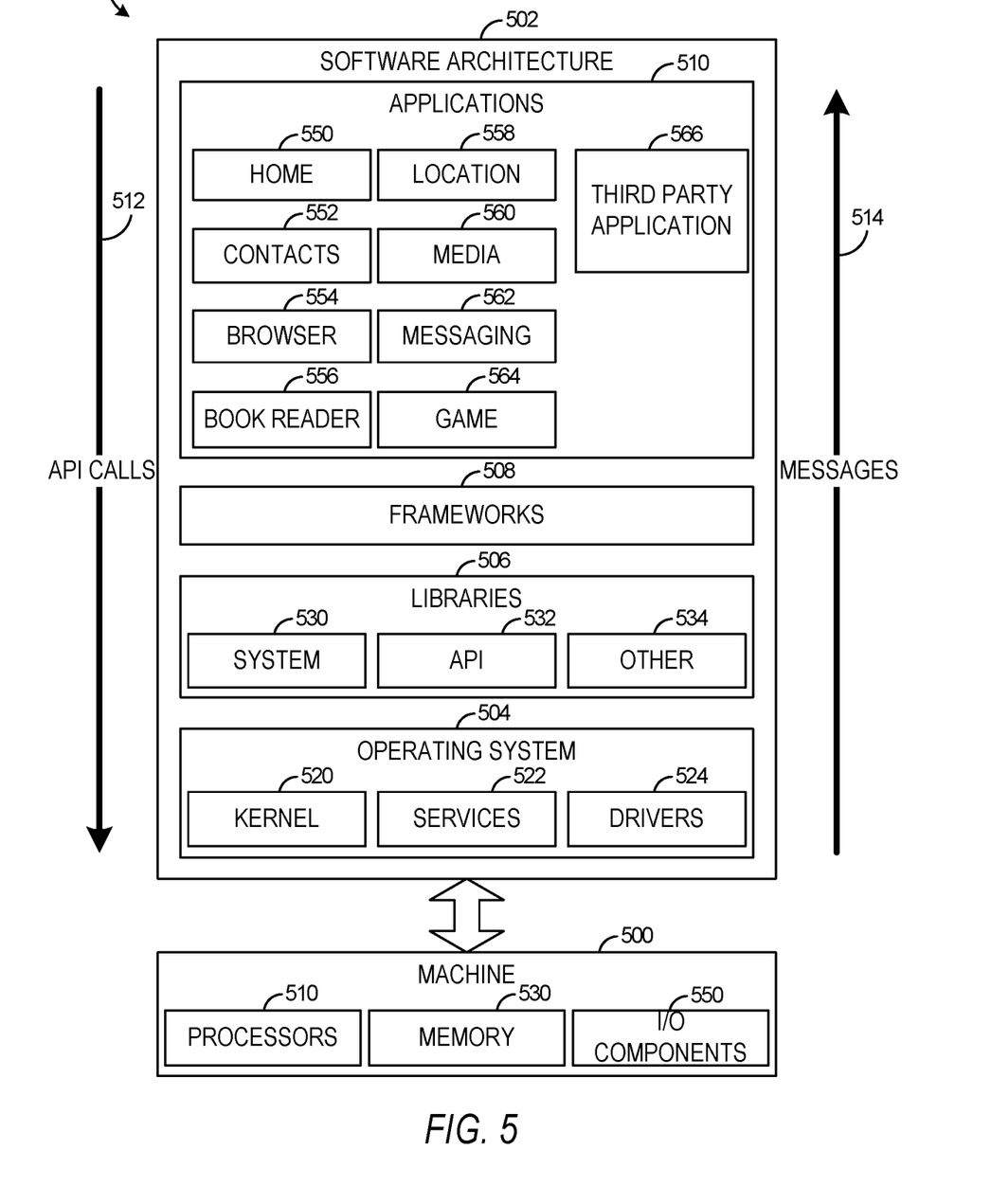
FIG. 5 is a block diagram illustrating a software architecture, in accordance with an example embodiment.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 510, memory 530, and input/output (I/O) components 550. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various GUI functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
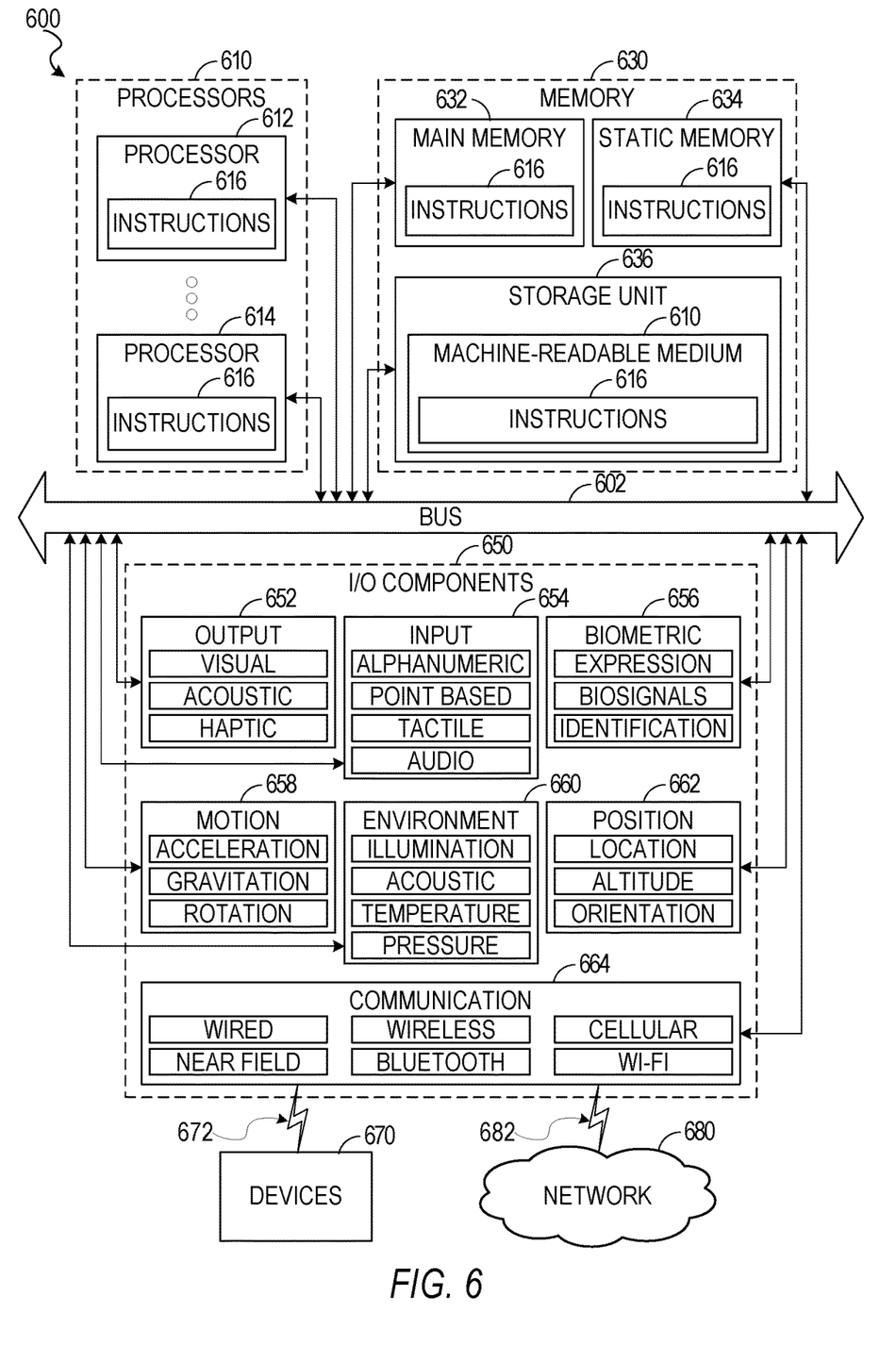
FIG. 6 illustrates a diagrammatic representation of a machine in the form of a computer system within which a set of instructions may be executed for causing the machine to perform any one or more of the methodologies discussed herein, in accordance with an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application 610, an applet, an app, or other executable code) for causing the machine 600 to perform any one or more of the methodologies discussed herein may be executed. For example, the instructions 616 may cause the machine 600 to execute the method 400 of FIG. 4. Additionally, or alternatively, the instructions 616 may implement FIGS. 1-4, and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors 612 (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor), multiple processors 610 with a single core, multiple processors 610 with multiple cores, or any combination thereof.

The memory 630 may include a main memory 632, a static memory 634, and a storage unit 636, all accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine 600 will depend on the type of machine 600. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a USB).

Moreover, the communication components 664 may detect identifiers or include components operable to detect identifiers. For example, the communication components 664 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 616 and/or data. The terms shall accordingly be taken to include, but not be limited to, solid-state memories, and optical and magnetic media, including memory internal or external to the processors 610. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 616 may be transmitted or received over the network 680 using a transmission medium via a network interface device (e.g., a network interface component included in the communication components 664) and utilizing any one of a number of well-known transfer protocols (e.g., HTTP). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method performed by a computer system having a memory and at least one hardware processor, the computer-implemented method comprising:
    storing parent documents of a first type and a corresponding document identifier for each one of the parent documents in a first table;
    storing child documents of a second type and a corresponding document identifier for each one of the child documents in a second table, the second table comprising, for each one of the child documents, an indication that the child document is related to one of the parent documents;
    building a base index using the first table and the second table, the base index storing the document identifiers of the parent documents and the document identifiers of the child documents in contiguous document blocks, each one of the document blocks storing the document identifier of one of the parent documents and the document identifier of each one of the child documents that is related to the parent document in a sorted order, the base index further storing document data of each one of the parent documents in association with the document identifier of the parent document and document data of each one of the child documents in association with the document identifier of the child document;
    subsequent to the building of the base index, updating a live index to include document identifiers of additional parent documents that have been added to the first table and document identifiers of additional child documents that have been added to the second table, the live index storing document data of each one of the additional parent documents in association with the document identifier of the additional parent document and document data of each one of the additional child document in association with the document identifier of the additional child document, wherein the base index comprises a compressed inverted index and the live index comprises a hash map;
    receiving a search query from a computing device of a user;
    computing a first set of search results based on a search of the base index using the search query;
    computing a second set of search results based on a search of the live index using the search query;
    computing a hybrid set of search results comprising a combination of the first set of search results and the second set of search results; and
    causing the hybrid set of search results to be displayed on the computing device of the user.

2. The computer-implemented method of claim 1, wherein the storing of the document identifier of one of the parent documents and the document identifier of each one of the child documents that is related to the parent document in the sorted order by each one of the document blocks comprises storing the document identifier of one of the parent documents directly preceded by the document identifier of each one of the child documents that is related to the parent document based on the indications in the second table.

3. The computer-implemented method of claim 1, further comprising:
    prior to the updating of the live index, copying the live index to a middle index; and
    subsequent to the receiving of the search query, computing a third set of search results based on a search of the middle index using the search query,
    wherein the hybrid set of search results further comprises the third set of search results.

4. The computer-implemented method of claim 1, wherein:
    the first set of search results comprises the document identifiers of a subset of the parent documents based on a determination that document data of the child documents related to the subset of the parent documents matches the search query; and
    the second set of search results comprises the document identifiers of a subset of the additional parent documents based on a determination that document data of the additional child documents related to the subset of the additional parent documents matches the search query.

5. The computer-implemented method of claim 1, wherein the computing of the
    second set of search results based on the search of the live index comprises:
        performing an exhaustive search of the document data associated with the document identifiers of the child documents in the live index using the search query to identify a subset of the child documents; and
        performing a search for the document identifiers of the parent documents related to the child documents in the identified subset of child documents.

6. The computer-implemented method of claim 1, wherein the parent documents comprise profiles of users of an online service and the child documents comprise resumes of the users of the online service.

7. The computer-implemented method of claim 1, wherein the parent documents comprise conversations between users of an online service and the child documents comprise messages between users of the online service.

8. The computer-implemented method of claim 1, wherein each one of the parent documents and the child documents to which it is related are stored in the same partition.

9. The computer-implemented method of claim 1, wherein the search of the base index is performed using a first JOIN clause, and the search of the live index is performed using a second JOIN clause.

10. A system comprising:
at least one hardware processor; and
a non-transitory machine-readable medium embodying a set of instructions that, when executed by the at least one hardware processor, cause the at least one hardware processor to perform operations, the operations comprising:
storing parent documents of a first type and a corresponding document identifier for each one of the parent documents in a first table;
storing child documents of a second type and a corresponding document identifier for each one of the child documents in a second table, the second table comprising, for each one of the child documents, an indication that the child document is related to one of the parent documents;
building a base index using the first table and the second table, the base index storing the document identifiers of the parent documents and the document identifiers of the child documents in contiguous document blocks, each one of the document blocks storing the document identifier of one of the parent documents directly and the document identifier of each one of the child documents that is related to the parent document in a sorted order, the base index further storing document data of each one of the parent documents in association with the document identifier of the parent document and document data of each one of the child documents in association with the document identifier of the child document;
subsequent to the building of the base index, updating a live index to include document identifiers of additional parent documents that have been added to the first table and document identifiers of additional child documents that have been added to the second table, the live index storing document data of each one of the additional parent documents in association with the document identifier of the additional parent document and document data of each one of the additional child document in association with the document identifier of the additional child document, wherein the base index comprises a compressed inverted index and the live index comprises a hash map;
receiving a search query from a computing device of a user;
computing a first set of search results based on a search of the base index using the search query;
computing a second set of search results based on a search of the live index using the search query;
computing a hybrid set of search results comprising a combination of the first set of search results and the second set of search results; and
causing the hybrid set of search results to be displayed on the computing device of the user.

11. The system of claim 10, wherein the storing of the document identifier of one of the parent documents and the document identifier of each one of the child documents that is related to the parent document in the sorted order by each one of the document blocks comprises storing the document identifier of one of the parent documents directly preceded by the document identifier of each one of the child documents that is related to the parent document based on the indications in the second table.

12. The system of claim 10, wherein the computer operations further comprise:
prior to the updating of the live index, copying the live index to a middle index; and
subsequent to the receiving of the search query, computing a third set of search results based on a search of the middle index using the search query,
wherein the hybrid set of search results further comprises the third set of search results.

13. The system of claim 10, wherein:
the first set of search results comprises the document identifiers of a subset of the parent documents based on a determination that document data of the child documents related to the subset of the parent documents matches the search query; and
the second set of search results comprises the document identifiers of a subset of the additional parent documents based on a determination that document data of the additional child documents related to the subset of the additional parent documents matches the search query.

14. The system of claim 10, wherein the parent documents comprise profiles of users of an online service and the child documents comprise resumes of the users of the online service.

15. The system of claim 10, wherein the parent documents comprise conversations between users of an online service and the child documents comprise messages between users of the online service.

16. The system of claim 10, wherein each one of the parent documents and the child documents to which it is related are stored in the same partition.

17. A non-transitory machine-readable medium embodying a set of instructions that, when executed by at least one hardware processor, cause the at least one hardware processor to perform operations, the operations comprising:
storing parent documents of a first type and a corresponding document identifier for each one of the parent documents in a first table;
storing child documents of a second type and a corresponding document identifier for each one of the child documents in a second table, the second table comprising, for each one of the child documents, an indication that the child document is related to one of the parent documents;
building a base index using the first table and the second table, the base index storing the document identifiers of the parent documents and the document identifiers of the child documents in contiguous document blocks, each one of the document blocks storing the document identifier of one of the parent documents and the document identifier of each one of the child documents that is related to the parent document in a sorted order, the base index further storing document data of each one of the parent documents in association with the document identifier of the parent document and document data of each one of the child documents in association with the document identifier of the child document;
subsequent to the building of the base index, updating a live index to include document identifiers of additional parent documents that have been added to the first table and document identifiers of additional child documents that have been added to the second table, the live index storing document data of each one of the additional parent documents in association with the document identifier of the additional parent document and document data of each one of the additional child document in association with the document identifier of the additional child document, wherein the base index comprises a compressed inverted index and the live index comprises a hash map;

receiving a search query from a computing device of a user;

computing a first set of search results based on a search of the base index using the search query;

computing a second set of search results based on a search of the live index using the search query;

computing a hybrid set of search results comprising a combination of the first set of search results and the second set of search results; and causing the hybrid set of search results to be displayed on the computing device of the user.

18. The non-transitory machine-readable medium of claim 17, wherein the storing of the document identifier of one of the parent documents and the document identifier of each one of the child documents that is related to the parent document in the sorted order by each one of the document blocks comprises storing the document identifier of one of the parent documents directly preceded by the document identifier of each one of the child documents that is related to the parent document based on the indications in the second table.

* * * * *